RICHARD J. BRESSON
INVENTOR.

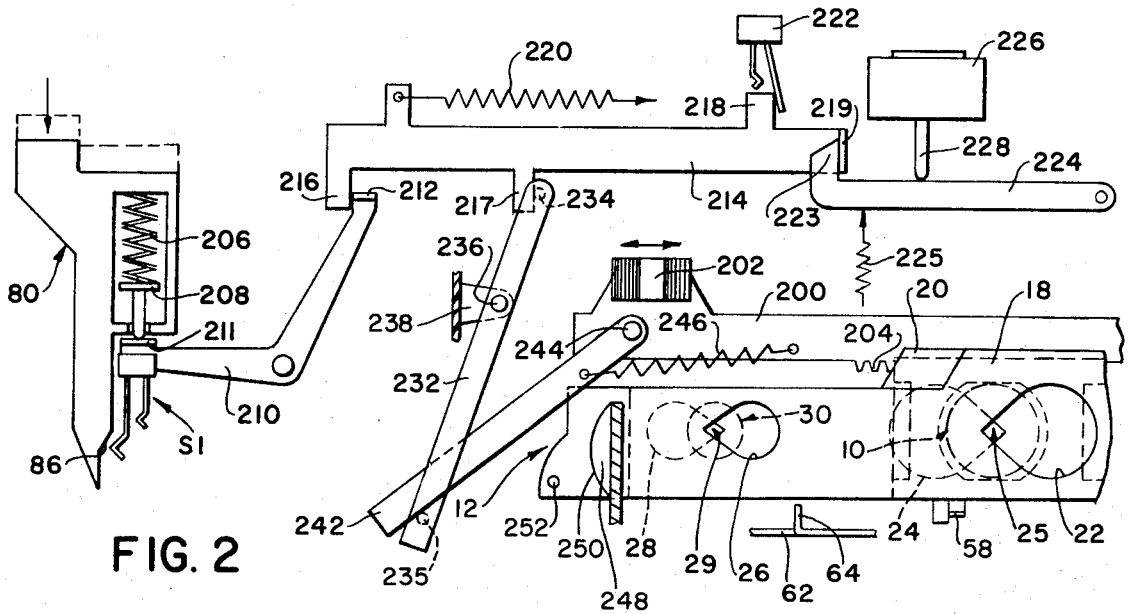

United States Patent Office 3,714,871
Patented Feb. 6, 1973

3,714,871
CAMERA APPARATUS ADAPTED FOR OPERATION WITH AUXILIARY LIGHT SOURCE
Richard J. Bresson, Rochester, N.Y., assignor to Eastman Kodak Company, Rochester, N.Y.
Filed Sept. 13, 1971, Ser. No. 179,710
Int. Cl. G03b 7/10
U.S. Cl. 95—10 C
2 Claims

ABSTRACT OF THE DISCLOSURE

An exposure control system for use in photographic apparatus which is adapted for operation with an auxiliary source of illumination such as a flash lamp. In particular, the exposure control system includes a radiation sensitive element disposed to receive illumination from a scene and a mechanism coupled to the radiation sensitive element for varying the size of the exposure aperture as a function of the scene radiation directed onto the radiation sensitive element. In a second mode of operation wherein an auxiliary source such as a flash lamp is used, a coupling mechanism is rendered operative for coupling a focusing mechanism associated with the camera lens to the aperture adjusting mechanism so that in the flash mode of operation, the shutter mechanism is set as a function of the focus distance. More specifically, the aperture adjusting mechanism tends to be driven by a motor until it engages the coupling mechanism which is set as a function of the focal distance.

CROSS REFERENCE TO RELATED APPLICATIONS

Reference is made to commonly assigned, copending U.S. application, Ser. No. 180,038, filed Sept. 13, 1971, filed in the name of Todd D. Cochran and entitled Camera Apparatus for Controlling Diaphragm and Shutter Speed.

BACKGROUND OF THE INVENTION

This invention relates to exposure control systems for use in photographic apparatus, such as cameras, and more particularly, to an exposure control system which is adapted to operate with an auxiliary light source such as a flash bulb.

In the exposure control system described in the above-identified application to Todd D. Cochran, there is shown a shutter mechanism including a first or opening blade for initiating the exposure interval and a second or closing blade which is actuated to terminate the exposure interval, and an exposure control circuit. The exposure control circuit includes an assembly responsive to incident scene radiation for providing a signal indicative thereof, a differential amplifier responsive to the signal to control the size of the exposure aperture, and an integrating circuit to control the length of the exposure interval. In particular, the integrating circuit includes a capacitor which is charged at a rate dependent upon the scene radiation incident upon the radiation sensitive assembly, and a first trigger circuit which is responsive to the potential stored upon the capacitor for actuating a transducer to release the closing blade and to thereby terminate the exposure interval. In addition, the size of the exposure aperture is controlled by a mechanism including a differential amplifier and a suitable motor for causing a diaphragm mechanism to vary the size of the exposure aperture as a function of incident scene illumination. The diaphragm mechanism includes first and second members whose relative position is varied to effect corresponding changes in the exposure aperture and also in a second variable aperture through which scene illumination may be directed onto the radiation sensitive assembly. Thus, the electrical parameter of the radiation sensitive assembly will vary not only as a function of the scene illumination but also the size of the second variable aperture. In operation, the differential amplifier will respond to the signal derived from the radiation sensitive assembly to energize the motor to a balance or null point at which the motor is no longer driven and a proper exposure aperture is achieved. Thus, under normal, outdoor situations where the object is illuminated by the sunlight, the exposure control operates to sense the scene illumination and to vary the exposure, i.e., the exposure interval and the size of the exposure aperture, as a function of the incident scene illumination.

In those situations where the scene illumination is too low to provide proper film exposure, it may be necessary to use a support (e.g., a tripod) for taking an extended or timed exposure or to use an auxiliary source of illumination such as a flash lamp. In the later case, the quantity of light is known and for a given sensitivity of film, the exposure is primarily a function of the distance between the camera and the object, i.e., focus distance. The problem toward which this invention is directed is that of adapting an exposure control system including a variable diaphragm mechanism for use in a flash mode.

SUMMARY OF THE INVENTION

It is an object of this invention to operate an exposure control system for camera apparatus in a first mode of operation wherein the exposure control is determined as a function of scene illumination and in a second mode wherein the exposure control is set as a function of focal distance.

It is a more particular object of this invention to adapt an exposure control mechanism of a camera apparatus to receive an auxiliary source of illumination and to thereby control the exposure primarily as a function of the distance between the camera apparatus and the object scene.

In accordance with the teachings of this invention, there is provided exposure control apparatus for operating in a first or daylight mode of operation for sensing incident scene radiation and for controlling the exposure as a function thereof and in a second or flash mode of operation for determining exposure primarily as a function of distance. More specifically, the exposure control apparatus includes a radiation sensitive element for providing a signal indicative of the incident scene illumination, a diaphragm mechanism responsive to the signal to vary in the first mode the exposure aperture as a function of scene illumination, and a linkage mechanism sensitive to the association of an auxiliary source such as a flash lamp to the camera for coupling the diaphragm mechanism to the focus setting to thereby control exposure as a function of the focus distance.

In an illustrative embodiment of this invention, the linkage mechanism is disassociated in the first or daylight mode of operation from the diaphragm mechanism to permit the diaphragm mechanism to set the exposure aperture as a function of incident scene illumination, and is coupled in a second or flash mode of operation to set the diaphragm mechanism and thereby the exposure aperture as a function of the focus distance. More specifically, the linkage mechanism is variably disposed as a function of the focus distance to engage and set the diaphragm mechanism as a function of the focal distance. The diaphragm mechanism may be driven by a suitable motor to vary the exposure aperture until it engages the linkage mechanism to thereby set the exposure aperture as a function of focus distance.

BRIEF DESCRIPTION OF THE DRAWINGS

The detailed operation of the preferred embodiment of this invention can be described more completely with reference to the accompanying drawings in which:

FIGS. 2 and 3 are elevated views of the shutter and diaphragm mechanisms shown in FIG. 1 in various stages of operation.

DETAILED DESCRIPTION OF THE INVENTION

An exposure control system according to the present invention includes an adjustable diaphragm mechanism including a member movable to any position along a path for varying an exposure aperture in accordance with the level of scene light, and a shutter mechanism controlled by an electronic time-delay circuit that establishes the length of an exposure interval. The time-delay circuit preferably is of the integrating type for continuously measuring the total accumulated amount of light energy impinging on a photoresponsive member in the timing circuit. After the diaphragm mechanism has been actuated to adjust the exposure aperture in accordance with the level of scene illumination, the shutter mechanism is then actuated to initiate an exposure interval under the control of the electronic timing circuit that terminates the exposure interval in accordance with the amount of illumination actually received during the exposure interval by the photoresponsive member in the timing circuit. The shutter timing circuit can compensate for the exposure aperture setting, for example, by adjustment of an electrical parameter of the timing circuit to vary its time constant, preferably by varying the aperture of the photoresponsive member used in the timing circuit in accordance with the adjustment of the exposure aperture by the diaphragm mechanism. The subject matter of this invention is related to how such an exposure control system may operate in a flash mode.

Figure 1:
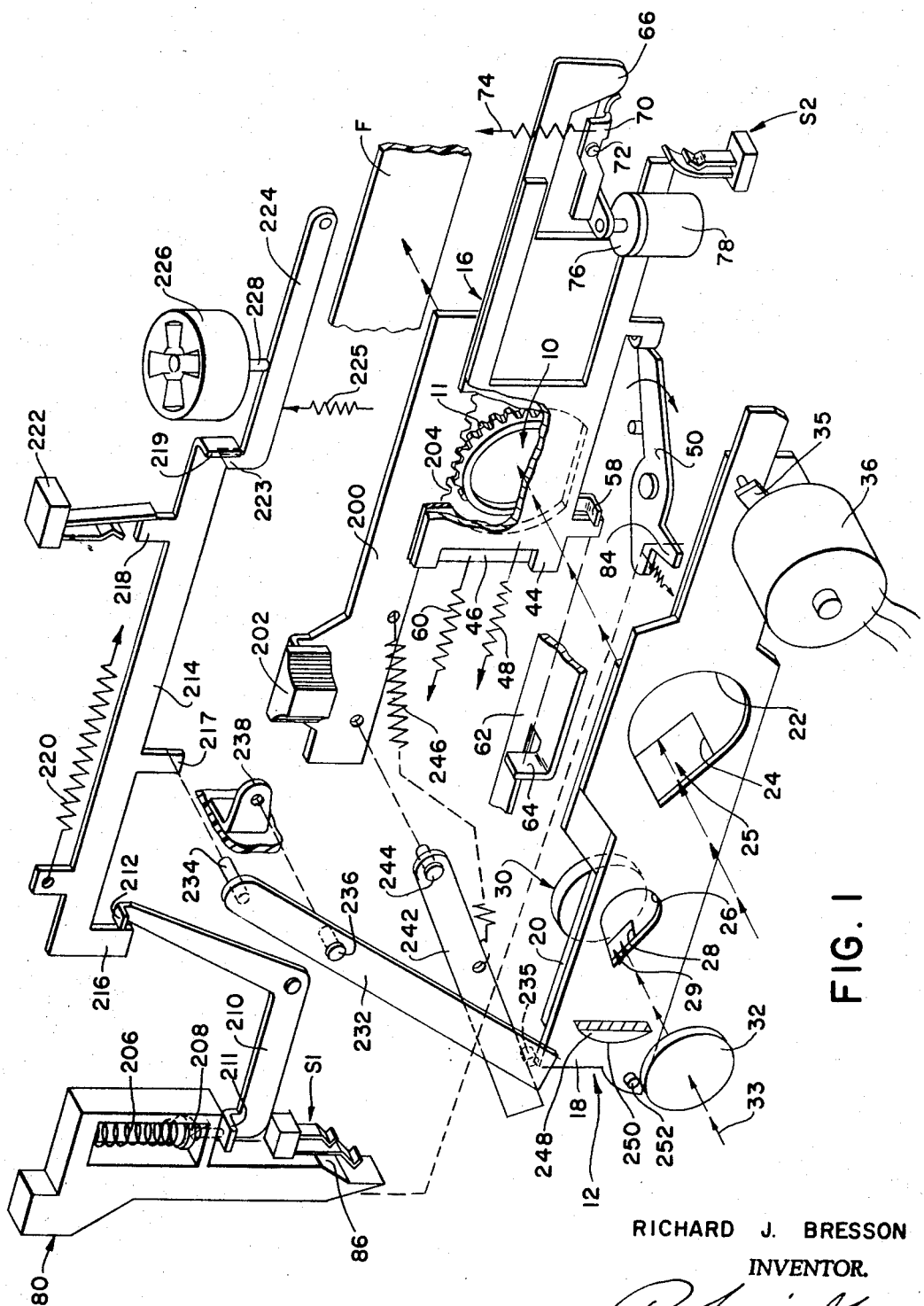
FIG. 1 is an exploded perspective view of the shutter and diaphragm mechanisms for the exposure control apparatus in accordance with the teachings of this invention.

Referring now to the accompanying drawings, FIG. 1 shows an exposure control apparatus according to a preferred embodiment of the invention, including an objective 10 for forming an image on photographic film F, a two-bladed diaphragm mechanism 12 for establishing a variable exposure aperture in alignment with an optical axis 14 of the objective, and a two-bladed shutter mechanism 16 for initiating and terminating an exposure through the objective.

The diaphragm mechanism 12 includes a pair of blades 18 and 20 that are slidably mounted upon suitable support means (not shown) for equal and opposite movement relative to the lens axis 14. Each of these blades has a tapered aperture 22 and 24, respectively, overlying each other to define an exposure aperture 25 aligned with the optical axis 14. The apertures 22 and 24 are disposed with their tapered portions extending in opposite directions with respect to each other along the line of travel of the two diaphragm blades, such that opposite movement of the blades 18 and 20 will enlarge or diminish the size of the exposure aperture 25. Each of the blades 18 and 20 also has a second tapered aperture 26 and 28, respectively, similar to the tapered apertures 22 and 24, overlying each other to define a second variable aperture 29 overlying a radiation sensitive assembly 30. A lens 32 having an optical axis 33 is positioned to form an image of an object scene on the assembly 30 through the variable aperture 29. Thus, opposite movement of the diaphragm blades 18 and 20 will result in a variation of the size of the aperture 29 over the assembly 30 simultaneously with the variation of the size of the exposure aperture 25. The diaphragm blades 18 and 20 are each connected to opposite ends of an armature 35 rotatably driven by an electromechanical transducer 36, which in this illustrative embodiment is a servo motor having input leads 38, 40 and 42. The operation of this servo motor will be described in further detail with respect to the circuit in FIG. 4 below.

The shutter mechanism 16 is a conventional two-blade system, which is shown in FIG. 1 in its cocked position preparatory to actuation to affect an exposure. The shutter mechanism includes a pair of shutter blades 44 and 46 which are slidably mounted upon suitable support means (not shown) for movement relative to the exposure aperture 25. When the blade 44, which is the "opening" blade in this embodiment, is in its cocked position shown, it is retained against the bias of a spring 48 by a latch member 50 which is biased by a spring 52 into latching engagement with a detent 53, in which position the latch member engages a pin 54. The "opening" blade 44 has a second detent 56 positioned to engage a detent 58 on the blade 46, which in this embodiment is the "closing" blade. Thus, blade 46 is retained in its cocked position against the bias of a spring 60 by the interengagement of the detents 56 and 58. In their respective cocked positions the "opening" blade 44 is retained in a covering relationship with respect to the exposure aperture 25, and the "closing" blade 46 is retained in an uncovering position with respect to the exposure aperture. When the blades are in their respective cocked positions, the spring 48 urges the "opening" blade 44 to an uncovering position with respect to the exposure aperture, and the spring 60 urges the "closing" blade 46 to a covering position over the exposure aperture.

The "closing" blade 46 also includes a second detent 66 having a cam surface 68 adapted to engage a retaining lever 70 pivotally mounted on a pin 72 and biased by a spring 74 in a counterclockwise direction into engagement with the detent 66. The opposite end of lever 70 is connected to an electromagnetic keeper 76 positioned adjacent a pole of an electromagnet 78 when the shutter blade 46 is in its cocked position. The electromagnet 78 is energized and de-energized by an electronic timing circuit discussed in more detail below with respect to FIG. 4. When the electromagnet is energized it holds the lever 70 in its retaining position shown in FIG. 1, to hold the blade 46 in its uncovering position when the detents 56 and 58 become disengaged upon release of the "opening" blade for movement to its uncovering position, thereby initiating an exposure interval. Thereafter, when the electromagnet 78 is de-energized, the bias of spring 60 overpowers the bias of the weaker spring 74 to cause the detent 66 to cam the lever 70 in a clockwise direction, thereby releasing the "closing" blade 46 for movement to a covering position with respect to the exposure aperture and terminate the exposure interval.

For actuation of the shutter mechanism 16 to effect an exposure, there is provided a shutter actuation button 80 mounted in an external position on the camera so as to be available to a camera operator. The button 80 is mechanically coupled by a coupling mechanism (not shown) to engage a detent 84 on shutter latch lever 50 and to move shutter latch lever 50 in a clockwise direction, when the shutter actuation button 80 is depressed. Initial movement of the button causes a surface 86 thereon to engage a contact of a normally open switch S1, thereby causing the switch S1 to be closed. Continued movement of the button 80 causes engagement with the dentent 84 and rotation of the latch 50 in a clockwise direction out of engagement with the detent 53 on the "opening" shutter blade 44, thereby releasing the blade for movement under the influence of spring 48 to an uncovering position with respect to the exposure aperture 24 to thereby initiate an exposure interval. When the "opening" blade 44 moves away from its cocked position, it moves out of engagement with one of the contacts of a normally closed switch S2, thereby causing switch S2 to open.

As shown in FIG. 1, the shutter mechanism is in its cocked position preparatory to actuation of the shutter mechanism to effect exposure by the operator. When the camera operator depresses the shutter actuation button 80, switch S1 closes energizing the exposure control circuit shown in FIG. 4, then latch 50 is rotated clockwise to release the "opening" blade 44 for movement to its uncovering position with respect to the exposure aperture 25 to thereby initiate an exposure interval and open timing switch S2. When shutter blade 44 moves to its uncovering position, the detent 56 moves out of engagement with the detent 58 on the closing shutter blade 46. However, the electromagnet 78 is energized by the exposure control circuit when the switch S1 is closed, as described below, and latch 70 is held in its retaining position by the electromagnet 78 to prevent the "closing" blade 46 from moving away from its unblocking position. After a period of time determined by the circuit in response to the level of illumination detected by a photosensitive element in the circuit, the electromagnet 78 is de-energized to release the "closing" blade 46 for movement to its blocking position to terminate the exposure interval. Following an exposure the shutter blades can be returned to their cocked positions by movement of a cocking lever 62 to engage a detent 64 thereon with the detent 56 on the "opening" blade to move the blades back to their cocked position, shown in FIG. 1.

As described above when the shutter actuation button 80 is pressed, switch S1 is closed prior to the release of the opening shutter blade 44. Closure of the switch S1 energizes the circuit, shown in FIG. 4, from a potential source such as a battery 19. When the switch S1 is closed, a circuit is completed between the battery 90 and a trigger circuit 92, which may illustratively take the form of the well known "Schmitt trigger." Because of the bias potential applied by the battery 19 to the trigger circuit 92, the trigger circuit 92 is energized from its first or non-conductive state to its second or conductive state. When the trigger circuit 92 is disposed in its conductive state, a current is caused to flow through a coil 94 associated with the electromagnet 78 to thereby retain the closing shutter blade 46 in its initial uncovering position after the opening blade 44 has moved away from its initial position.

Figure 4:
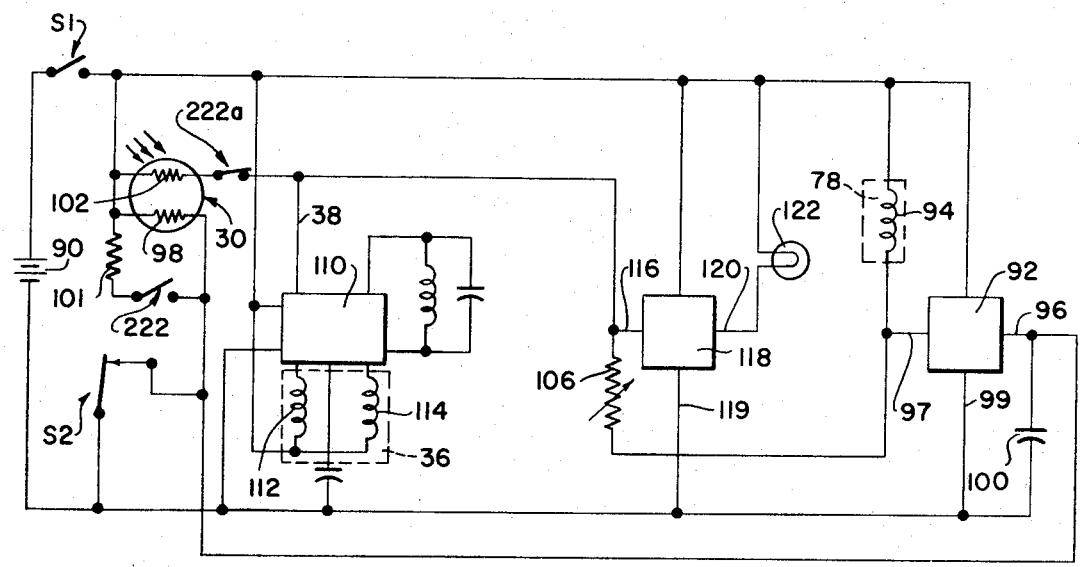
FIG. 4 shows a circuit diagram for controlling the mechanism shown in FIGS. 1–3 and including a time delay circuit for controlling the exposure interval and a diaphragm control circuit for varying the exposure aperture.

The trigger circuit 92 has an input terminal 96 which is connected to the common point between a capacitor 100, and a radiation sensitive assembly 30 and in particular, a radiation sensitive element 98 whose impedance varies as a function of incident scene illumination. As will be explained later, the capacitor 100 and the radiation sensitive element 98 act as an integrating circuit to control the release of the closing shutter blade 46 to terminate the exposure interval. As shown in FIG. 4, the switch S2 serves to short circuit the capacitor 100 until the opening shutter blade 46 is released from its cocked position and to open the normally closed switch S2 to thereby initiate the exposure interval. Thus, as the opening shutter blade 44 is released to permit scene illumination to be directed to the film F, the capacitor 100 is charged at a rate dependent upon the scene illumination directed through the aperture 29 onto the element 98. The potential stored upon the capacitor 100 will increase to a threshold level to cause the circuit 92 to be switched from its second or conductive state to its first or non-conductive state thereby de-energizing the electromagnet 78. As a result, the lever 70 is no longer attracted by the electromagnet 78, and the bias of spring 69 is sufficient to move the closing shutter blade 46 to its covering position with respect to the exposure aperture 25 and to thereby terminate the exposure interval.

The assembly 30 includes a second radiation sensitive element 102 having an impedance which varies as a function of incident scene illumination. As shown in FIG. 4, the radiation sensitive element 102 is connected to an input terminal 38 of an aperture control circuit 110. The aperture control circuit 110 may illustratively take the form of a differential amplifier such as disclosed in commonly assigned copending U.S. application Ser. No. 823,-426 or Ser. No. 823,789 filed respectively in the names of Daniel E. Carter et al. on May 9, 1969 and May 12, 1969. Other examples of control circuits that can be used to control the aperture according to this invention are disclosed in U.S. Pat. No. 3,427,941 issued to L. M. Metzger on Feb. 18, 1969. When switch S1 is closed, battery 90 applies a suitable biasing potential through terminals 40 and 42 to the aperture control circuit 110 to cause the aperture control circuit 110 to energize a pair of drive coils 112 and 114 of the transducer 36 as a function of an input signal applied to the input terminal from the radiation sensitive element 102. In one example of this invention, the aperture control circuit 110 may take the form of a differential amplifier which serves to vary the energizing current through the drive coils 112 and 114 to thereby rotate the armature 35 in one direction or the other dependent upon whether a greater current is directed through drive coils 112 or 114.

As shown in FIG. 1, the transducer 36 drives the armature 35 in either a clockwise or counterclockwise direction to thereby respectively decrease or increase the size of the apertures 25 and 28. As will be explained in detail later, the diaphragm blades 18 and 20 are initially set so that the apertures 25 and 29 are set at their minimal size to thereby minimize the effects of the memory of the radiation sensitive elements 98 and 102. When switch S2 is closed, the armature 35 of the transducer 36 will normally be rotated by the drive coils 112 and 114 to increase the size of the exposure apertures 25 and 29 to an aperture size dependent upon the level of illumination directed through the aperture 29 onto the radiation sensitive element 102. As the size of aperture 29 increases, more radiation will be directed onto the radiation sensitive element 102 to thereby decrease the resistance of impedance presented by this element. As explained above, when switch S1 is closed, trigger circuit 92 is disposed in its conductive state to thereby complete a circuit from the positive terminal of battery 90 through the radiation sensitive element 102, a variable resistance 106, the terminals 97 and 98 of the trigger circuit 92 to the negative terminal of the battery 90. A voltage divider will be formed by the radiation sensitive element 102 and the variable impedance 106 across the battery 90 to provide a varying signal at the input terminal 38 that is functionally related to the level of scene radiation upon the radiation sensitive element 102. As the resistance of the element 102 decreases, the potential applied to the input terminal increases until the applied potential is equal to a predetermined reference potential of the aperture control circuit 110. At this potential, a null condition is achieved and the circuit 110 applies equal currents through the drive coils 112 and 114 so that substantially equal, counterbalanced forces are applied to the armature 35. Thus, the diaphragm blades 18 and 20 are driven to set the size of aperture 25 as a function of the scene radiation. In this first mode of operation, the size of the aperture 25 has been adjusted for relatively high levels of scene radiation to provide proper exposure of the film F. The amount of light directed onto the radiation sensitive element 102 has also been adjusted to a substantially fixed quantum dependent upon the intensity of this scene illumination as well as the size of the aperture 29; as a result, the resistance of the element 102 will be adjusted as the size of aperture 29 varies, to a predetermined value related to the potential level at which the exposure aperture control circuit 110 achieves a null condition. Thus, it may be seen that for varying intensities of radiation within a predetermined first range, the diaphragm blades 18 and 20 will be driven to vary the size of the apertures 25 and 29 so that a substantially constant amount of illumination will be directed onto the element 102 and correspondingly, the impedance of the element 102 will be adjusted to a predetermined value. In a similar manner, the resistance presented by the radiation sensitive element 98 at null condition will be adjusted to a substantially constant, predetermined impedance for varying intensities of radiation within the first range.

As shown in FIG. 4, there is provided a feedback coil 113 disposed to sense the flux generated by the drive coils 112 and 114 to provide a feedback signal to the differential amplifier 110 to retard the rate of change at which the drive coils 112 and 114 are driven, in response to changes of the impedance of the radiation sensitive element 102.

In the first mode of operation, the aperture 29 is opened from its minimal setting to an opening at which the size of aperture 25 is adjusted for proper film exposure to thereby minimize the memory effect of the elements 98 and 102. The resistivity of elements 98 and 102 vary as an inverse function of the level of incident radiation; after an initial exposure to a high level of radiation, the elements 98 and 102 may not respond accurately to a decrease in the level of incident radiation and their resistivity may remain relatively low. As a result of this "memory" effect, the radiation sensitive elements 98 and 102 are not able to respond accurately to lower levels of radiation once they have been exposed to high levels of radiation. Thus, to minimize the memory effect, the size of aperture 29 is increased from its minimal opening until a null condition is reached.

In the operation of the shutter mechanism and the diaphragm mechanisms shown in FIG. 1, the shutter actuation button 80 is depressed to first close switch S1 to thereby adjust the size of the apertures 25 and 29 through the operation of the aperture control circuit 110 as explained above. In one illustrative embodiment of this invention, this operation will require approximately 40 milliseconds and will be substantially completed by the time the opening shutter blade 44 is released and the switch S2 is opened to commence the exposure interval and the timing operation. Thus, in the first mode of operation when the exposure interval commences, the impedance of the radiation sensitive element 98 has been adjusted to a substantially predetermined value so that the capacitor 100 will charge to the threshold level of the trigger circuit 92 within a substantially constant period of time. Thus, the exposure intervals for the first mode of operation will be a substantially constant value.

It may be noted however, that the mechanism shown in FIG. 1 and the circuit shown in FIG. 4 will be mass produced, and that variations may occur within the manufacturing tolerances of these devices so that the impedance of the radiation sensitive element 102 may not always be the exact same value, and the apertures 25 and 29 may not be adjusted to the correct exposure openings. Under these conditions, the integrating circuit including element 98 and the capacitance 100 may serve to compensate for this variation by adjusting the exposure interval to a slightly different length of time thereby compensating for any slight error in the size of the aperture 25.

The exposure control apparatus described above is adapted not only to operate in a first range of levels of scene radiation, but also to expose film to scen radiation of relatively lower intensities which would require longer exposure intervals. If the level of scene radiation is low enough, a supplementary light source or an extended exposure interval may be needed which would require firm camera support. The circuitry shown in FIG. 4 includes a suitable indicator means such as an indicator lamp 122 which operates, when the shutter actuation button 80 is initially pressed to close switch S1 to provide an indication that the scene illumination is too low to provide a normal exposure of the film and that either firm camera support or an additional light source must be used. In order to energize the indicator lamp 122, the radiation sensitive element 102 is connected to an input terminal 116 of a trigger circuit 118 which serves to energize the lamp 122. The trigger circuit 118 may illustratively take the form of the well known "Schmitt trigger" and operates to provide a conductive path between its output terminal 120 and its terminal 121 in response to the application to its input terminal 116 of a potential signal below a predetermined threshold level. When the circuit path between the input terminals 120 and 119 becomes nonconductive, the indicator lamp 122 is de-energized or turned off. As explained above, when switch S1 is closed, the trigger circuit 92 is actuated to provide a low conductive path between its terminals 97 and 98 thereby establishing a circuit from the positive terminal of the battery 90 through the radiation sensitive element 102, and the variable impedance 106 to the negative terminal of the battery 90. Thus, if the radiation directed onto the radiation sensitive element 102 is below a predetermined level, the impedance of the element 102 will be sufficient that the voltage applied to the input terminal 116 will fall below the threshold value of the trigger circuit 118 and a low conductive path is established between its terminals 120 and 121 to thereby energize the indicator light 122. When indicator light 122 is energized, the operator is informed that there is insufficient illumination to provide a proper exposure without an additional source of radiation such as a flash cube or that a tripod is needed for an extended or time exposure. If the operator chooses, he may place the camera on a tripod and continue to press the shutter actuation button 80 to initiate a time or extended exposure of the film F.

In the second mode of operation, the level of radiation is relatively low compared to the first range so that the impedance presented by the element 102 will be correspondingly higher. As a result, the potential developed at the input terminal 38 of the aperture control circuit 110 will no be sufficient to achieve a null condition and the circuit 110 will continue to energize the drive coils 112 and 114 to drive the blades 18 and 20 to open the apertures 25 and 29 to their maximum settings. The opening of the apertures 25 and 29 will normally occur within a relatively short period of time before switch S2 is opened to thereby initiate the timing process. In the second mode of operation, sufficient film exposure is not achieved at the maximum opening of the aperture 25 and the predetermined exposure interval used in the first mode of operation. In order to achieve proper film exposure, the exposure interval is extended for a period of time to achieve proper exposure with the aperture 25 set at its maximum opening. More specifically, when the switch S2 is opened, the capacitor 100 begins to charge at a rate determined by the impedance of the radiation sensitive element 98, which as explained above is dependent upon the scene radiation directed through the aperture 29 onto the element 98. The capacitor 100 stores the charge until the threshold level of trigger circuit 92 has been reached at which time the trigger circuit 92 is disposed in its first or non-conductive state thereby de-energizing the coil 78 and releasing the closing shutter blade 46 to terminate the exposure interval.

As explained above, the lamp 122 will be energized when the scene illumination is no longer sufficient to achieve proper film exposure without the aid of a tripod or an auxiliary source of light. As explained in the above-identified application, entitled, "Camera Apparatus for Controlling Diaphragm Shutter Speed," the lamp 122 is used to provide an indication of the end of the exposure interval. More specifically, when the trigger circuit 92 is disposed in its non-conductive state, the circuit through which the lamp 122 is energized is broken to thereby de-energize the lamp 122.

In the second mode of operation, the lamp 122 will be energized to indicated that there is insufficient scene illumination to achieve proper film exposure. Instead of taking an extended or time exposure, it may be desired to use an auxiliary source of illumination such as a flash lamp 230 which may be attached to the camera as by inserting into an assembly 226. In the flash mode of operation, the illumination is primarily determined in many instances by the illumination provided by the flash lamp which radiates a substantially predetermined amount of light. Further, the exposure interval is fixed as will be explained later for a time period in excess of the useful duration (e.g., 30 milliseconds) of illuminatiton burst from the flash lamp 230 so that film exposure is determined primarily by the focus distance between the camera apparatus and the object or scene to be photographed. In accordance with the teachings of this invention, a suitable mechanism is provided for coupling the lens 10 to the mechanism for setting the size of the aperture 24 as a function of the focus distance. More specifically, the lens 10 is set for a particular focus distance as derived from a rangefinder or perhaps by estimation. As shown in FIG. 1, the lens 10 may be set at its correct focus distance by a focusing member 200 having an attached knob 202 which is disposed on the exterior of the camera to be manipulated by the operator. The focusing member 200 has a plurality of teeth 204 thereon which are disposed in engagement with teeth 11 upon the lens 10; thus, as the knob 202 is moved in a lateral direction, this motion is imparted to the lens 10 to properly rotate and to adjust the lens.

In the first mode of operation wherein no flashlamp is inserted within the assembly 226, the focusing member 200 is disassociated or decoupled from the exposure aperture setting mechanism. More specifically, the assembly 226 includes a finger 228 dispossable in a first position as shown in FIGS. 1 and 2 and in a second position as shown in FIG. 3. The insertion of a flash lamp 230 causes the finger 228 to assume the second or extended position to thereby engage and to rotate a flash mode lever 224 in a counterclockwise direction (as seen in FIG. 3). In the first mode of operation where no flash lamp 230 is inserted within the assembly 226, the flash mode lever 224 is biased by a spring 225 to a position wherein a tab 223 associated with the lever 224 engages a slide 214. More specifically, the tab 223 engages a tab 219 integrally connected with the slide 214 to thereby hold the slide 214 in the position shown in FIGS. 1 and 2 against the bias of a spring 220. The slide 214 includes a tab 217 which engages a pin 234 affixedly connected to a first lever 232. As shown in FIG. 1, the lever 232 is pivotally mounted by a spring 236 upon a bracket 238. The bracket 238 may be fixedly mounted to a portion of the camera housing. The first lever 232 has a second pin 235 extending therefrom to engage a second lever 242 which is pivotally mounted about a pin 244. In turn, the pin 244 is connected to the focusing member 200 in a manner to permit the second lever 242 to rotate thereabout. A spring 246 has one end connected to the focusing member 200 and the other end connected to the second lever 242 to bias the lever 242 in a counterclockwise direction. As will be explained later, the first and second levers 232 and 242 may be moved under the influence of the slide 214 so as to limit the movement of the diaphragm mechanism 12. However, with the flash mode lever 224 retaining the slide 214, the first and second levers 232 and 242 are retained in their position as shown in FIGS. 1 and 2 and out of engagement with a pin 252 mounted upon the blade 18 of the diaphragm mechanism 12. Further, the actuating button 80 may be depressed without effecting the movement of the slide 214. More specifically, a spring 206 is disposed to urge a pin 208 into engagement with a tab 211 associated with control lever 210. The control lever 210 is pivotally mounted so that the tab 211 engages the pin 208 and a second tab 212 thereof engages a tab 216 affixed to the slide 214. Thus, when no flash lamp is inserted in the assembly 226, the actuating button 80 may be depressed downward with the result that the pin 208 compresses the spring 206 without imparting a motion to the control lever 210.

With regard to FIG. 3, the flashlamp 230 is inserted into the assembly 226 to cause the finger to extend from its first position as shown in FIG. 2 to its second, extended position as shown in FIG. 3. In response thereto, the flash mode lever 224 is rotated in a counterclockwise direction as shown in FIG. 3 and its tab 223 is disengaged from the tab 219 of the slide 214. In the flash mode of operation, when the actuating button 80 is depressed, the pin 208 now serves to rotate the control lever 210 in a counterclockwise direction as shown in FIG. 3. In turn, the tab 212 of the control lever 210 engages the tab 216 of the slide 214 to impart a motion to the slide 214 to the left as shown in FIG. 3 against the bias of the spring 220. The spring 246 imparts a counterclockwise motion to the second lever 242 to thereby engage the pin 235 of the first lever 232 and to impart a similar, counterclockwise motion to the second lever 232. Thus, the pin 234 of the second lever 232 is urged against the tab 217 of the slide 214 to thereby follow the motion of the slide 214, to the left. As the first lever 232 rotates in a counterclockwise direction, the pin 235 moves generally to the right as shown in FIG. 3 to allow the second lever 242 to engage the pin 252 mounted upon the blade 18 of the diaphragm mechanism 12. The second lever 242 will rotate in a clockwise direction under the influence of the spring 246 to direct the blade 18 to the right as shown in FIG. 3 until the second lever 242 comes to rest against a surface 250 of a cam member 248. The cam member 248 is fixedly mounted upon the housing of the camera apparatus. Thus, the distance that the diaphragm blade 18 is urged to the right is dependent upon the position of the pin 242 about which the lever 242 rotates; the position of the pin 244 is in turn directly related to the focus distance as set by the camera operator. The spring 246 exerts a sufficient force to direct the diaphragm blade 18 to the right to thereby set the position of the diaphragm blades 18 and 20 and also the size of the exposure aperture 24 as a function of the focal distance. As the diaphragm blade 18 is moved further to the right, the exposure aperture 24 is made smaller and as the diaphragm 18 is moved to the left as shown in FIG. 3, the exposure aperature 24 is made larger. As a result, the size of the aperture 24 and thus the exposure of the film is made dependent upon the position of the focusing member 200 and in turn upon the focus distance, i.e., distance between the camera apparatus and the scene to be photographed.

With reference to FIG. 4, the diaphragm mechanism 12 is controlled by the excitation of the pair of coils 112 and 114 which serve to move the blades 18 and 20 by the servo motor 36 as more specifically shown in FIG. 1. As explained above, scene illumination is directed through the aperture 29 onto the resistive element 102 and the impedance or resistivity of the element 102 is a function of the incident scene illumination to provide a signal to be applied to the differential amplifier 110 to energize coils 112 and 114. The apertures 24 and 29 are set initially at their minimum opening and the differential amplifier 110 normally serves to energize the servo motor 36 to increase the size of the apertures 24 and 29. As the aperture 29 continues to open, more scene illumination is directed onto the element 102. The resistance and the signal developed across the element 102 will continue to vary until a null condition is achieved by the differential amplifier 110 to thereby achieve a balance in the energization of the coils 112 and 114. In the flash mode of operation, the incident scene illumination is normally insufficient to permit film exposure without the aid of an additional support or auxiliary light source. Thus, the resistivity of the element 102 will be high and the differential amplifier 110 will continue to drive the servo motor 36 and thereby the blades 18 and 20 to open the aperture 24 without reaching a null condition. Thus, the circuitry of FIG. 4 and the servo motor 36 serve as means for opening the exposure aperture 24 and to move the diaphragm blade 18 to the right as shown in FIG. 3 until pin 252 engages the second lever 242. As explained above, the lever 242 under the influence of the spring 246 directs the diaphragm blade 18 to the right as shown in FIG. 3 over the influence of the servo motor 36 to thereby set the size of the exposure aperture 24 as a function of the focal distance.

With reference to FIG. 3, the insertion of the flash lamp 230 serves to release the slide 214 so that when it is moved to the left under the influence of the actuating button 80, a switch 222 is closed. With reference to FIG. 4, the closed switch 222 connects a resistor 101 in parallel across the radiation sensitive element 98 and in circuit with capacitor 100. In the flash mode, the primary source of illumination is normally derived from the flash lamp 230 and the exposure interval must be adjusted primarily as a function of the useful portion of the duration of the flash lamp 230 (e.g., 30 milliseconds). The impedance of the resistive element 100 is chosen to determine the exposure interval primarily as a function of the useful portion of the flash derived from the lamp 230. Thus, when a flashlamp 230 is inserted within the assembly 226, the exposure interval will be determined primarily by the resistive element 101 and the size of the exposure aperture 24 will primarily be determined by the position of the focusing member 200 and thereby the focal distance. In an illustrative embodiment of this invention, a switch 222a coupled to the switch 222 to be opened by the movement of the slide 214 to the left, may be inserted in the circuit of FIG. 4. Thus, a high or infinite impedance is presented to the differential amplifier 110 to drive rapidly the servo motor 36 and thus the diaphragm mechanism 12 toward the maximum size of the exposure aperture 24. As a result, the differential amplifier 110 is unbalanced by the open switch 222a to a maximum degree to energize the servo motor 36. Under cold conditions when the diaphragm mechanism 12 may tend to move sluggishly, the servo motor 36 will be driven harder to ensure the desired movement of the blades 18 and 20.

Thus, there has been shown a camera with an exposure control apparatus in accordance with the teachings of this invention which is operative in a first mode to control the film exposure as a function of incident scene illumination and in a second or flash mode to set the exposure interval as a function of the distance between the camera apparatus and the scene to be photographed. More specifically, a coupling is provided between the mechanism for setting the focus distance of the lens and the diaphragm mechanism to thereby set the exposure aperture as a function of the focus distance. Further, there is provided drive means taking illustratively the form of a servo motor for directing the diaphragm mechanism and in particular at least one of the diaphragm blades against the coupling mechanism.

The invention has been described in detail with particular reference to the preferred embodiments thereof, but it will be understood that variations and modifications can be affected within the spirit and scope of the invention.

I claim:

1. In combination with a camera having adjustable diaphragm means, lens means, and means for focusing said lens means, and adapted for exposing film to scene illumination, apparatus for controlling the adjustment of the size of said diaphragm means in proportion to scene illumination intensity and in proportion to the focusing of said lens means, said apparatus comprising:

means associated with said camera for receiving an auxiliary illumination source;

circuit means, including photosensitive means disposed to receive scene illumination;

motor means, coupled to said circuit means and responsive thereto for motivating said diaphragm to vary the size of said diaphragm means in proportion to scene illumination intensity; and linkage means, coupled to said focusing means and responsive to the receiving of an auxiliary illumination source by said receiving means and to the focusing of said lens means, for moving to a position to be engaged by said diaphragm means as said motor means motivates said diaphragm means to increase said diaphragm size so that the size of said diaphragm means is controlled in proportion to focus of said lens means.

2. Apparatus as claimed in claim 1, wherein said circuit includes switch means, and control circuit means coupled in circuit with said photoresponsive means by said switch means for controlling said motor means, said switch means being responsive to the receiving of an auxiliary illumination source by said receiving means for interrupting the circuit between said photosensitive means and said control circuit means, so that said circuit means causes said motor means to motivate said diaphragm to increase in size.

References Cited

UNITED STATES PATENTS

| 3,610,124 | 10/1971 | Hiruma | 95—11 L |
|---|---|---|---|
| 3,537,375 | 11/1970 | Kiper et al. | 95—64 A |
| 3,427,941 | 2/1969 | Metzger | 95—64 D |
| 3,473,452 | 10/1969 | Ivester | 95—64 A |
| 3,496,849 | 2/1970 | Winkler et al. | 95—64 A |
| 3,511,144 | 5/1970 | Gotze | 95—64 A |
| 3,505,936 | 4/1970 | Engelsmann et al. | 95—10 C |

ROBERT P. GREINER, Primary Examiner

U.S. Cl. X.R.

95—10 CD, 11 L, 64 A, 64 D